(12) United States Patent
Hattori et al.

(10) Patent No.: US 9,369,012 B2
(45) Date of Patent: Jun. 14, 2016

(54) ELECTRIC MOTOR AND ELECTRIC COMPRESSOR USING THE SAME

(75) Inventors: Makoto Hattori, Tokyo (JP); Shinichi Isobe, Tokyo (JP)

(73) Assignee: MITSUBISHI HEAVY INDUSTRIES AUTOMOTIVE THERMAL SYSTEMS CO., LTD., Kiyosu-shi (JP)

( * ) Notice: Subject to any disclaimer, the term of this patent is extended or adjusted under 35 U.S.C. 154(b) by 74 days.

(21) Appl. No.: 13/990,196

(22) PCT Filed: Apr. 6, 2012

(86) PCT No.: PCT/JP2012/059468
§ 371 (c)(1),
(2), (4) Date: May 29, 2013

(87) PCT Pub. No.: WO2012/141085
PCT Pub. Date: Oct. 18, 2012

(65) Prior Publication Data
US 2013/0257210 A1 Oct. 3, 2013

(30) Foreign Application Priority Data

Apr. 15, 2011 (JP) .................................. 2011-090956

(51) Int. Cl.
*H02K 1/27* (2006.01)
(52) U.S. Cl.
CPC ................ *H02K 1/27* (2013.01); *H02K 1/2766* (2013.01)
(58) Field of Classification Search
CPC ............................... H02K 1/27; H02K 1/2766
USPC ........................... 310/156.08, 156.53, 156.56
See application file for complete search history.

(56) References Cited

U.S. PATENT DOCUMENTS

| 4,327,302 A | 4/1982 | Hershberger |
| 5,191,256 A | 3/1993 | Reiter, Jr. et al. |

(Continued)

FOREIGN PATENT DOCUMENTS

| CN | 1196597 A | 10/1998 |
| DE | 10 2005 047 771 A1 | 4/2007 |

(Continued)

OTHER PUBLICATIONS

International Search Report for PCT/JP2012/059468, mailing date of Jul. 3, 2012.

(Continued)

*Primary Examiner* — Terrance Kenerly
(74) *Attorney, Agent, or Firm* — Westerman, Hattori, Daniels & Adrian, LLP

(57) ABSTRACT

Provided is an electric motor in which magnets are reduced in size, thus achieving a reduction in cost, and in which a magnetic torque and a reluctance torque are effectively used by adjusting the magnetic flux density to improve the efficiency, thus achieving a reduction in size and cost. The electric motor is equipped with a rotor that includes a cylindrical rotor iron core in which main magnetic poles and auxiliary magnetic poles are alternately disposed in the circumferential direction, a substantially V-shaped magnet insertion hole that is provided for each of the main magnetic poles and whose convex portion faces a rotor center and is centered on a d-axis passing through the rotor center and the circumference-wise center of the main magnetic pole, and two magnets per pole that are embedded in the magnet insertion hole in a substantially V-shaped manner.

4 Claims, 4 Drawing Sheets

(56) References Cited

U.S. PATENT DOCUMENTS

| | | | |
|---|---|---|---|
| 5,990,593 A * | 11/1999 | Narita et al. | 310/156.53 |
| 6,147,428 A | 11/2000 | Takezawa et al. | |
| 2003/0178905 A1 | 9/2003 | Koharagi et al. | |
| 2004/0212266 A1 * | 10/2004 | Hans | 310/156.56 |
| 2005/0001503 A1 | 1/2005 | Hans | |
| 2006/0113858 A1 | 6/2006 | Hino et al. | |
| 2007/0063607 A1 | 3/2007 | Hattori | |
| 2008/0007131 A1 * | 1/2008 | Cai et al. | 310/156.38 |
| 2009/0134732 A1 * | 5/2009 | Shichijoh et al. | 310/156.53 |
| 2012/0126637 A1 * | 5/2012 | Ankeney et al. | 310/43 |

FOREIGN PATENT DOCUMENTS

| | | | |
|---|---|---|---|
| EP | 1 662 634 A2 | 5/2006 | |
| JP | 11-341719 A | 12/1999 | |
| JP | 2000-50546 A | 2/2000 | |
| JP | 2003-116235 A | 4/2003 | |
| JP | 2004-104962 A | 4/2004 | |
| JP | 2004-135375 A | 4/2004 | |
| JP | 2005-86955 A | 3/2005 | |
| JP | 2005-110485 A | 4/2005 | |
| JP | 3913205 B2 | 5/2007 | |
| JP | 2007-252018 A | 9/2007 | |
| JP | 2007-274798 A | 10/2007 | |
| JP | 2010-98830 A | 4/2010 | |
| WO | 91/09443 A1 | 5/1991 | |

OTHER PUBLICATIONS

Written Opinion of the International Searching Authority for PCT/JP2012/059468, mailing date of Jul. 3, 2012.
Office Action dated Apr. 3, 2015, issued in corresponding Chinese Patent Application No. 2012800039299, with English translation (14 pages).
Decision of Rejection dated May 12, 2015, issued in corresponding Japanese Patent Application No. 2011-090956, with English translation (6 pages).
Decision to Grant a Patent dated Oct. 5, 2015 issued in counterpart Japanese patent application No. 2011-090956, (3 pages). Explanation of Relevancy—"The Decision to Grant a Patent has been received."
Extended Search Report dated Feb. 29, 2016, issued in couterpart European Application No. 12771007.7 (8 pages).

* cited by examiner

ELECTRIC MOTOR AND ELECTRIC COMPRESSOR USING THE SAME

TECHNICAL FIELD

The present invention relates to a magnet-embedded-type electric motor in which permanent magnets are embedded in a rotor and also relates to an electric compressor using the same.

BACKGROUND ART

In air conditioners and refrigerators, an electric compressor equipped with an electric motor is used in order to compress a refrigerant. For the motor of the electric compressor, a magnet-embedded-type electric motor is used, which is provided with a rotor in which a plurality of permanent magnets are embedded at predetermined intervals in the circumferential direction on the outer periphery of a rotor iron core formed by laminating magnetic steel plates.

This electric motor includes a stator and the rotor, which is disposed on an inner side of the stator with a predetermined gap therebetween. The rotor has a structure in which a plurality of main magnetic poles, provided with magnet insertion holes in which permanent magnets are embedded, and a plurality of auxiliary magnetic poles (auxiliary salient poles), formed by iron core portions located between the main magnetic poles, are alternately disposed in the circumferential direction in a plane perpendicular to the axial direction. Thus, a rotating torque is obtained by using both a magnetic torque generated by the magnetic flux of the permanent magnets and a reluctance torque generated by salient-pole characteristics of the auxiliary magnetic poles and the main magnetic poles.

In such electric motors, PTLs (Patent Literatures) 1 and 2 etc. propose electric motors equipped with a rotor in which a magnet insertion hole is provided for each of the main magnetic poles in the rotor iron core, the magnet insertion hole having substantially a V-shape whose convex portion faces the center of the rotor and is centered on a d-axis that passes through the center of the rotor and the circumference-wise center of the main magnetic pole, and two permanent magnets per pole are embedded in the magnet insertion hole in a substantially V-shaped manner.

CITATION LIST

Patent Literature

{PTL 1} Publication of Japanese Patent No. 3913205
{PTL 2} Japanese Unexamined Patent Application, Publication No. 2010-98830

SUMMARY OF INVENTION

Technical Problem

The electric motors proposed by PTLs 1 and 2 have a structure in which the magnets are embedded in almost the whole area of the substantially V-shaped magnet insertion hole, the two magnets embedded per pole are themselves relatively large, and a magnetic shielding space (flux barrier) formed at the convex portion of the substantially V-shaped magnet insertion hole has substantially the same size as the magnet insertion hole. However, this structure is not designed to adjust the magnetic flux and the reluctance torque to improve the rotating torque and the motor efficiency.

Furthermore, the above-described PTLs do not suggest or disclose an improvement of the efficiency of the electric motor achieved by optimizing the embedment depth of a magnet, specifically, the embedment depth by which an inner end of a magnet is embedded in the magnet insertion hole from the outer periphery of the rotor, and the distance between magnetic poles, specifically, the interpole distance between main magnetic poles at the position of the outer periphery of the rotor, in order to achieve a reduction in size and cost.

The present invention has been made in view of such circumstances, and as object thereof is to provide an electric motor in which magnets are reduced in size as much as possible to reduce the use of rare-earths etc., thus achieving a reduction in cost, and the magnetic torque and the reluctance torque are effectively used by adjusting the magnetic flux density to improve the efficiency, thus achieving a reduction in size and cost, and also to provide an electric compressor using this electric motor.

Solution To Problem

In order to solve the above-described problems, the electric motor and the electric compressor using the same of the present invention employ the following solutions.

Specifically, an electric motor according to a first aspect of the present invention is equipped with a rotor including a cylindrical rotor iron core in which a plurality of main magnetic poles and a plurality of auxiliary magnetic poles are alternately disposed in a circumferential direction, a substantially V-shaped magnet insertion hole that is provided for each of the main magnetic poles and whose convex portion faces a center of the rotor and is centered on a d-axis passing through the center of the rotor and a circumference-wise center of the main magnetic pole, and two magnets per pole that are embedded in the magnet insertion hole in a substantially V-shaped manner, in which a magnetic shielding space that shields an area between poles of the adjacent magnets is provided at the convex portion of the magnet insertion hole; and the magnetic shielding space has a shape having a predetermined width in the circumferential direction and protruding radially outward and inward with respect to the magnet insertion hole.

According to the above-described aspect, in the electric motor equipped with the rotor in which the two magnets per pole are embedded in the substantially V-shaped magnet insertion hole that is provided for each of the main magnetic poles on the rotor iron core and whose convex portion faces the center of the rotor, the magnetic shielding space, which shields an area between poles of the adjacent magnets, is provided at the convex portion of the magnet insertion hole, the magnetic shielding space has a shape having a predetermined width in the circumferential direction and protruding radially outward and inward with respect to the magnet insertion hole. Thus, the magnetic shielding space, which is provided at the convex portion of the substantially V-shaped magnet insertion hole, is formed in a shape having a predetermined width in the circumferential direction and protruding radially outward and inward with respect to the magnet insertion hole, thereby making it possible to reduce the size of each magnet corresponding to the size of the magnetic shielding space and to reduce leakage magnetic flux caused by short-circuit between the two magnets, thus reducing reactive magnetic flux. Therefore, if it is possible to reduce the use of a rare-earth material (for example, neodymium) that forms the magnet, thus achieving a reduction in cost, and to increase a magnetic flux density to increase the magnetic torque, thus improving the motor efficiency and achieving a reduction in size and cost.

Furthermore, in the electric motor according to the above-described aspect, the magnetic shielding space has a substantially trapezoidal shape whose upper and lower portions protrude radially outward and inward with respect to the magnet insertion hole.

According to the above-described aspect, the magnetic shielding space has a substantially trapezoidal shape whose upper and lower portions protrude radially outward and inward with respect to the magnet insertion hole. Thus, by appropriately setting the lengths of the upper and lower sides of the magnetic shielding space, which has a substantially trapezoidal shape, the magnetic shielding space, which has a required size of the trapezoidal shape having a predetermined width in the circumferential direction and protruding radially outward and inward with respect to the magnet insertion hole, can be formed at the convex portion of the substantially V-shaped magnet insertion hole. Therefore, the size of the magnet and the leakage magnetic flux can be reliably reduced by sufficiently increasing the size of the magnetic shielding space.

Furthermore, in the electric motor according to the above-described aspect, projections for setting positions where the magnets are installed are provided at portions where the magnetic shielding space and the magnet insertion hole intersect.

According to the above-described aspect, the projections for setting the installation positions of the magnets are provided at the portions where the magnetic shielding space and the magnet insertion hole intersect. Thus, even when the radially protruding portions of the magnetic shielding space are made to be sufficiently larger than the vertical extent of the magnet insertion hole, the magnets inserted into the magnet insertion hole can be set and positioned at predetermined positions by means of the projections. Therefore, it is possible to prevent the magnets from moving into the magnetic shielding space and to reliably position and install the magnets at the predetermined positions, thus bringing out a primary function.

Furthermore, in the electric motor according to the above-described aspect, the protruding portions of the magnetic shielding space, which protrude radially outward and inward, form separated auxiliary magnetic-shielding spaces located with predetermined gaps away from a main magnetic-shielding space located between the substantially V-shaped magnet insertion hole.

According to the above-described aspect, the protruding portions of the magnetic shielding space, which protrude radially outward and inward, are separated auxiliary magnetic-shielding spaces located with predetermined gaps away from the main magnetic-shielding space located between the substantially V-shaped magnet insertion hole. Thus, it is possible to reliably reduce leakage magnetic flux between the two magnets by means of the main magnetic-shielding space and the auxiliary magnetic-shielding spaces and to effectively use a reluctance torque as a rotating torque by making magnetic lines pass between the main magnetic-shielding space and the separated auxiliary magnetic-shielding spaces. Therefore, both the magnetic torque and the reluctance torque can be used in a balanced manner, thus improving the motor efficiency.

Furthermore, in the electric motor according to the above-described aspect, when an embedment depth by which an inner end of each of the magnets is embedded in the magnet insertion hole from an outer periphery of the rotor is represented by F, and an outer diameter of the rotor is represented by D, F/D is set within a range from 0.067 to 0.121.

With the structure in which the two magnets per pole are embedded in a substantially V-shaped manner in the substantially V-shaped magnet insertion hole, provided in the main magnetic pole on the rotor, when the embedment depth F by which an inner end of each of the magnets is embedded in the magnet insertion hole from the outer periphery of the rotor is used as a parameter, it was found that the motor efficiency had the maximum value. According to the present invention, when the embedment depth by which the inner end of the magnet is embedded in the magnet insert ion hole from the outer periphery of the rotor is represented by F, and the outer diameter of the rotor is represented by D, F/D is sot within a range from 0.067 to 0.121. The motor efficiency shows the maximum value when F/D is set to 0.078, and the motor efficiency can be maintained in a desired range by setting F/D within a range from 0.067 to 0.121. Therefore, by optimizing the embedment depth F of the magnet, the motor efficiency can be improved, thus achieving a reduction in size and cost of the motor.

Furthermore, in the electric motor according to the above-described aspect, when an interpole distance between the main magnetic poles at a position on an outer periphery of the rotor is represented by L, and an outer diameter of the rotor is represented by D, L/D is set within a range from 0.062 to 0.082.

With the structure in which the two magnets per pole are embedded in a substantially V-shaped manner in the substantially V-shaped magnet insertion hole, provided in the main magnetic pole on the rotor, when the interpole distance L between the main magnetic poles at the position of the outer periphery of the rotor is used as a parameter, it was found that the motor efficiency bad the maximum value. According to the above-described aspect, when the interpole distance between the main magnetic poles at the position of the outer periphery of the rotor is represented by L, and the outer diameter of the rotor is represented by D, L/D is set within a range from 0.062 to 0.082. The motor efficiency shows the maximum value when L/D is set to 0.073, and the motor efficiency can be maintained in a desired range by setting L/D within a range from 0.062 to 0.082. Therefore, by optimizing the interpole distance L between the main magnetic poles, the motor efficiency can be improved, thus achieving a reduction in size and cost of the motor.

Furthermore, in the electric motor according to the above-described aspect, when an embedment depth by which an inner end of each of the magneto is embedded in the magnet insertion hole from an outer periphery of the rotor is represented by F, an interpole distance between the main magnetic poles at a position on the outer periphery of the rotor is represented by L, and an outer diameter of the rotor is represented by D, F/D is set within a range from 0,067 to 0.121, and L/D is set within a range from 0.062 to 0.082.

According to the above-described aspect, when the embedment depth by which an inner end of the magnet is embedded in the magnet insertion hole from the outer periphery of the rotor is represented by F, the interpole distance between the main magnetic poles at the position of the outer periphery of the rotor is represented by L, and the outer diameter of the rotor is represented by D, F/D is set within a range from 0.067 to 0.121, and L/D is set within a range from 0.062 to 0.082. Thus, by setting F/D within a range from 0.067 to 0.121, which includes 0.078 at which the motor efficiency shows the maximum value, and by setting L/D within a range from 0.062 to 0.082, which includes 0.073 at which the motor efficiency shows the maximum value, the motor efficiency can be maintained in a desired range. Therefore, the embedment depth F of the magnet and the interpole distance L between the main magnetic poles are respectively optimized to improve the motor efficiency, thereby achieving a reduction in size and cost of the motor.

Furthermore, an electric motor according to a second aspect of the present invention is equipped with a rotor including a cylindrical rotor iron core in which a plurality of main magnetic poles and a plurality of auxiliary magnetic poles are alternately disposed in a circumferential direction, a substantially V-shaped magnet insertion hole that is provided for each of the main magnetic poles and whose convex portion faces a center of the rotor and is centered on a d-axis passing through the center of the rotor and a circumference-wise center of the main magnetic pole, and two magnets per pole that are embedded in the magnet insertion hole in a substantially V-shaped manner, in which a magnetic shielding space that shields an area between poles of the adjacent magnets is provided at the convex portion of the magnet insertion hole; and, when an embedment depth by which an inner end of each of the magnets is embedded in the magnet insertion hole from an outer periphery of the rotor is represented by F, an interpole distance between the main magnetic poles at a position on the outer periphery of the rotor is represented by L, and an outer diameter of the rotor is represented by D, F/D is set within a range from 0.067 to 0.121, and L/D is set within a range from 0.062 to 0.082.

According to the above-described aspect, in the electric motor equipped with the rotor in which the two magnets per pole are embedded in the substantially V-shaped magnet insertion hole that is provided for each of the main magnetic poles on the rotor iron core and whose convex portion faces the center of the rotor, when the embedment depth by which an inner end of the magnet is embedded in the magnet insertion hole from the outer periphery of the rotor is represented by F, the interpole distance between the main magnetic poles at the position of the outer periphery of the rotor is represented by L, and the outer diameter of the rotor is represented by D, F/D is set within a range from 0.067 to 0.121, and L/D is set within a range from 0.062 to 0.082. Thus, by setting F/D within a range from 0.067 to 0.121, which includes 0.078 at which the motor efficiency shows the maximum value, and by setting L/D within a range from 0.062 to 0.082, which includes 0.073 at which the motor efficiency shows the maximum value, the motor efficiency can be maintained in a desired range. Therefore, the embedment depth F of the magnet and the interpole distance L between the main magnetic poles are respectively optimized to improve the motor efficiency, thereby achieving a reduction in size and cost of the motor.

Furthermore, an electric compressor according to a third aspect of the present invention includes a compression mechanism and an electric motor connected to the compression mechanism, the compression mechanism being drivable via the electric motor, in which the electric motor is any one of the above-described electric motors.

According to the above-described aspect, in the electric compressor in which the compression mechanism is drivable via the electric motor, the electric motor is any one of the above-described electric motors. Thus, the electric compressor can foe manufactured by using the high-performance electric motor that has been reduced in size and cost by reducing the size of the magnet and improving the motor efficiency. Therefore, a compact, easy-to-be-mounted, high-performance, and inexpensive electric compressor can be provided.

Advantageous Effects of Invention

According to the electric motor of the present invention, the magnetic shielding space, provided at the convex portion of the substantially V-shaped magnet insertion hole, is formed in a shape having a predetermined width in the circumferential direction and protruding radially outward and inward with respect to the magnet insertion hole, thereby making it possible to reduce the size of each magnet corresponding to the size of the magnetic shielding space and to reduce leakage magnetic flux caused by short-circuit between the two magnets, thus reducing reactive magnetic flux. Thus, it is possible to reduce the use of rare-earths (for example, neodymium) that form the magnet, thus achieving a reduction in cost, and to increase the magnetic flux density to increase the magnetic torque, thus improving the motor efficiency and achieving a reduction in size and cost.

Furthermore, according to the electric motor of the present invention, when the embedment depth of the magnet is represented by F, the interpole distance between the main magnetic poles is represented by L, the outer diameter of the rotor is represented by D, F/D is set within the range from 0.067 to 0.121, which includes 0.078 at which the motor efficiency shows the maximum value, and L/D is set within the range from 0.062 to 0.082, which includes 0.073 at which the motor efficiency shows the maximum value, thereby making it possible to maintain the motor efficiency in a desired range. Thus, the embedment depth F of the magnet and the interpole distance L between the main magnetic poles are respectively optimized to improve the motor efficiency, thereby achieving a reduction in size and cost of the motor.

According to the electric compressor of the present invention, the electric compressor can be manufactured by using the high-performance electric motor that has been reduced in size and cost by reducing the size of the magnet and improving the motor efficiency. Therefore, a compact, easy-to-be-mounted, high-performance, and inexpensive electric compressor can be provided.

DESCRIPTION OF EMBODIMENTS

Embodiments of the present invention will be described below with reference to the drawings.

First Embodiment

Figure 1:
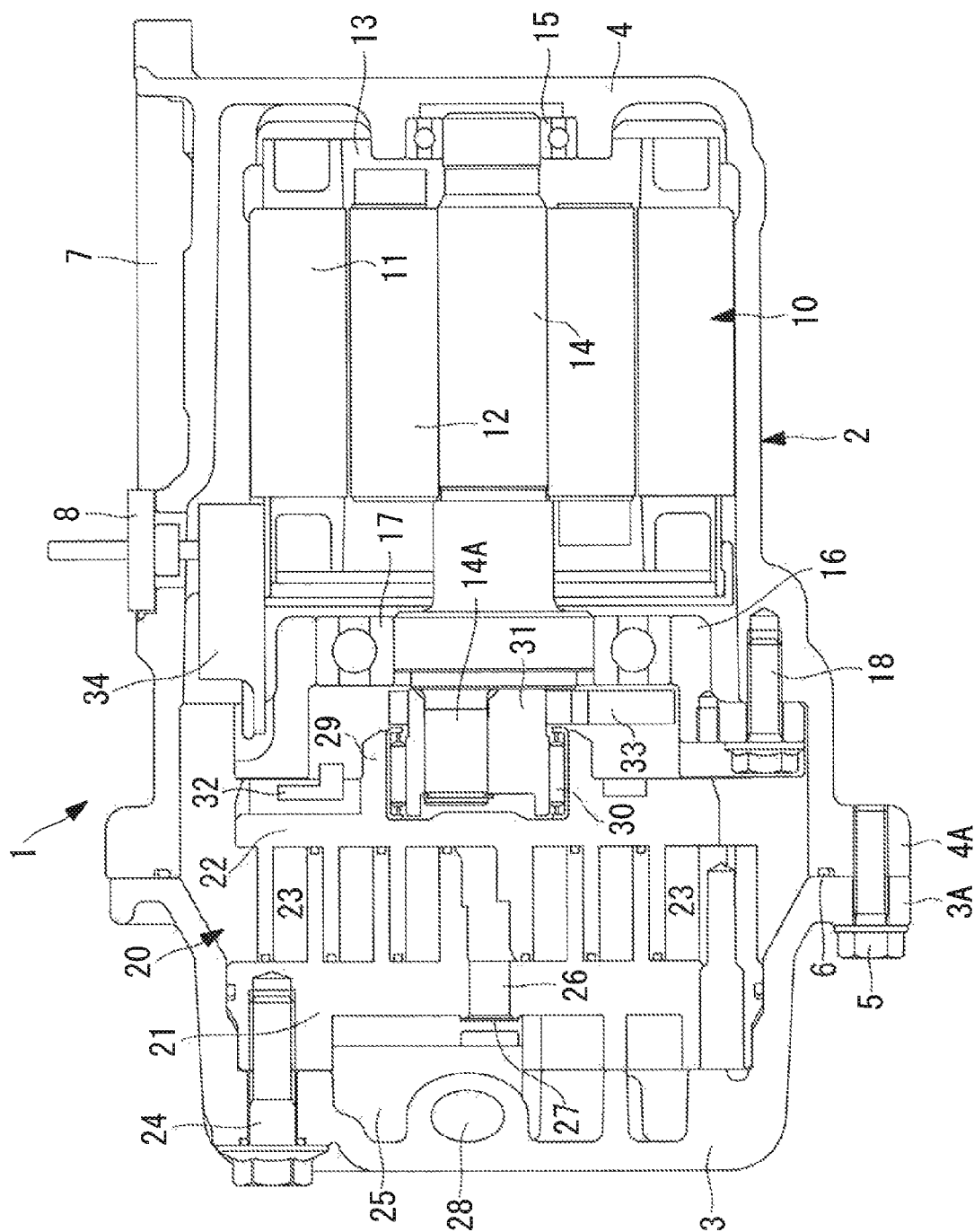
FIG. 1 is a longitudinal sectional view of an electric compressor according to a first embodiment of the present invention.

A first embodiment of the present invention will be described below with reference to FIGS. 1 to 3 and FIGS. 6 and 7. FIG. 1 is a longitudinal sectional view showing an electric compressor according to the first embodiment of the present invention.

Although a scroll-type electric compressor 1 is shown in this embodiment, the compressor itself is not limited to a scroll-type compressor, and, as a matter of coarse, the present invention can be applied to various types of compressors. The electric compressor 1 is provided with a cylindrical housing 2 forming an outer shell. The housing 2 is constituted by a compressor housing 3 and a motor housing 4, which are aluminum die-cast parts formed in a closed-bottomed cylindrical shape and which form into a single piece when flange parts 3A and 4A integrally formed with the compressor housing 3 and the motor housing 4, respectively, are tightened with a bolt 5 via an O-ring 6.

An inverter accommodating portion 7 is integrally provided on an outer periphery of the motor housing 4. An inverter (not shown) is mounted in the inverter accommodating portion 7 for converting DC power supplied from a power-supply unit (not shown) into three-phase AC power and applying the AC power to an electric motor (hereinafter, also referred to as just a motor) 10 installed inside the motor housing 4, via a hermetic terminal 8. Note that the inverter can be a known inverter, and a detailed description thereof will be omitted here.

The electric motor 10 installed inside the motor housing 4 includes a stator 11 and a rotor 12, and the stator 11 is fixed to an inner periphery of the motor housing 4 by press-fitting. Gas passages (not shown) that penetrate in the axial direction are provided at multiple positions circumferentially, between the stator 11 and the motor housing 4. Low-pressure refrigerant gas suctioned from a suction port (not shown) provided on a rear side of the motor housing 4 into a space 13 located between a bottom face of the motor housing 4 and an end face of the electric motor 10 can be made to flow into a front side of the housing 2 via the gas passages.

The rotor 12 is integrally coupled with a rotary shaft (crankshaft) 14. A rear end of the rotary shaft 14 is rotatably supported by a bearing 15 provided at a bottom face portion of the motor housing 4, and a front end of the rotary shaft 14 is rotatably supported by a main bearing 17 provided on a bearing member 16. A crank pin 14A that is located eccentrically from the center of the rotary shaft by a predetermined distance is integrally provided at the front end of the rotary shaft 14. Note that the bearing member 16 is fixedly supported at an open side of the motor housing 4 via a bolt 16.

On the other hand, a scroll compression mechanism (compression mechanism) 20 is provided inside the compressor housing 3. The scroll compression mechanism 20 is a known compression mechanism that is formed by engaging a fixed scroll 21 with an orbiting scroll 22, the fixed scroll 21 and the orbiting scroll 22 forming a pair. A pair of compressor spaces 23 formed between the scrolls 21 and 22 are moved from an outer periphery portion toward a center portion while reducing their volumes due to the orbital motion of the orbiting scroll 22, thereby compressing the low-pressure refrigerant gas into high-pressure gas.

The fixed scroll 21 is fixedly installed at a bottom face side of the compressor housing 3 with a bolt 24, and a discharge chamber 25 is formed between an end-plate back face of the fixed scroll 21 and the bottom face of the compressor housing 3. The high-pressure gas is discharged into the discharge chamber 25 via a discharge port 26 and a discharge valve 27 from a central compression space formed at the center portion when the pair of compressor spaces 23 are joined, and the high-pressure gas is discharged from the discharge chamber 25 to the outside via a discharge pipe (not shown) connected to a discharge opening 28.

An end-plate back face of the orbiting scroll 22 is supported by a thrust surface of the bearing member 16. Furthermore, the orbiting scroll 22 is coupled with the crank pin 14A of the rotary shaft 14 at a boss part 29 provided on the end-plate back face of the orbiting scroll 22, via a needle bearing 30 and a drive bush 31, and is orbitally driven about the fixed scroll 21 by the rotation of the rotary shaft 14. Rotation of the orbiting scroll 22 is prevented via an Oldham ring 32 interposed between the end-plate back face thereof and the bearing member 16. Note that the drive bush 31 is integrally provided with a balance weight 33 that is used to adjust an unbalanced load generated by the orbital driving applied to the orbiting scroll 22.

Figure 2:
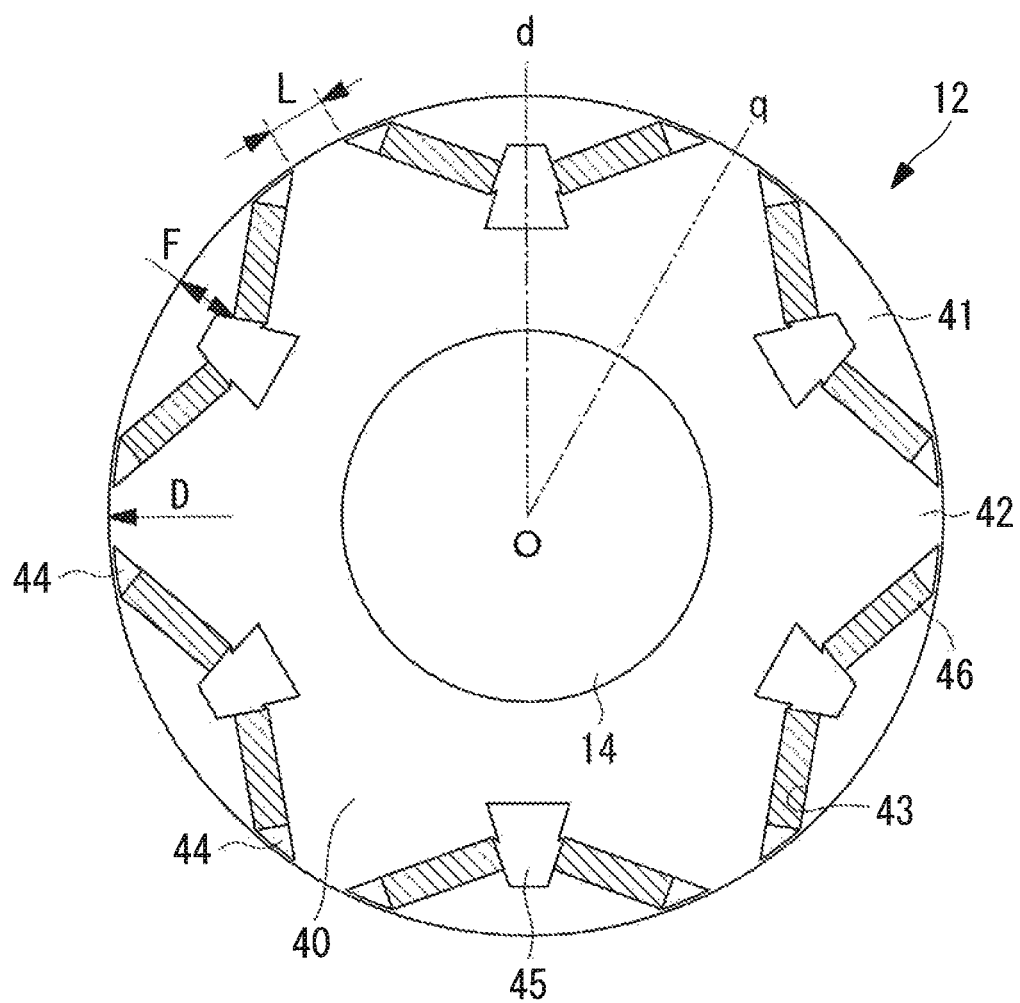
FIG. 2 is a transverse sectional view of a rotor of an electric motor used in the electric compressor shown in FIG. 1, in a plane perpendicular to an axial direction of the rotor.
Figure 3:
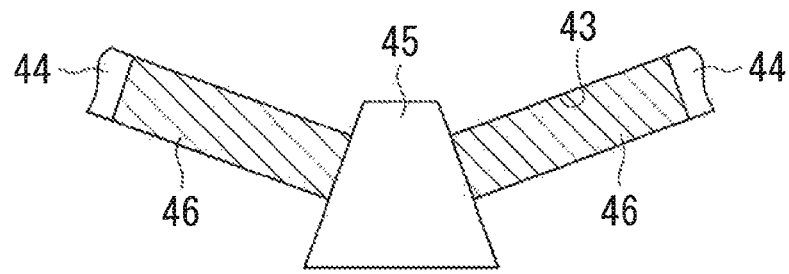
FIG. 3 is a view partially showing, in enlarged form, a magnet arrangement structure in the rotor shown in FIG. 2.

In the above-described electric compressor 1, as shown in FIGS. 2 and 3, the rotor 12 of the electric motor 10 has a cylindrical rotor iron core 40 in which multiple thin-sheet-like magnetic steel plates are laminated, and the rotary shaft 14, which penetrates in the axial direction, is fixed in the center of the rotor iron core 40. The rotor iron core 40 has a structure in which a plurality of main magnetic poles 41, which correspond in number to the number of motor poles (in this embodiment, six poles) and which are provided with magnet insertion holes 43 in which permanent magnets (hereinafter, also simply referred to as magnets) 46 are embedded, and a plurality of auxiliary magnetic poles (auxiliary salient poles) 42 that are formed by iron core portions located between the main magnetic poles 41 are alternately disposed in the circumferential direction on the outer periphery of the rotor iron core 40 so as to surround the rotary shaft 14.

In the electric motor 10, when three-phase AC power is applied to the stator 11 to produce a rotating magnetic field, the rotating magnetic field acts on the permanent magnets 46 of the rotor 12 to produce a magnetic torque, and, in addition to the magnetic torque, a reluctance torque acts on the rotor 12. In FIG. 2, when an axis that passes through a rotor center O and a circumference-wise center of the main magnetic pole 41 is a d-axis, and an axis that passes through the interpole center between the adjacent main magnetic poles 41, specifically, an axis that passes through the rotor center O and a circumference-wise center of the auxiliary magnetic pole 42 is a q-axis, a reluctance torque is produced by the difference in ease with which the magnetic flux passes through the d-axis and the q-axis. Note that this embodiment shows an example 6-pole motor in which the d-axis and the q-axis are respectively provided at regular intervals of 60 degrees.

For each of the main magnetic poles 41, the magnet insertion hole 43, having substantially a V-shape whose convex portion faces the rotor center O and is centered on the d-axis passing through the circumference-wise center of the main magnetic pole 41, is provided; magnetic shielding spaces (flux barriers) 44 are provided at both circumferential end portions of the magnet insertion hole 43; and a relatively-large magnetic shielding space (flux barrier) 45, having a substantially trapezoidal shape, is provided at the convex portion of the V-shape, specifically, at a center portion thereof. As shown in FIG. 3, the magnetic shielding space 45 has a trapezoidal shape whose upper and lower sides are set to appropriate lengths, thereby having a predetermined width in the circumferential direction, and whose upper and lower portions protrude radially outward and inward by predetermined distances with respect to the magnet insertion hole 43.

Per pole, two permanent magnets 46, each of which is rectangular in cross section, are embedded between the magnetic shielding spaces 44 provided at the circumferential end portions of the substantially V-shaped magnet insertion hole 43 and the magnetic shielding space 45 provided at the center portion thereof. As the magnets 46, it is desirable to use more-compact, high-heat-resistance, and high-retention-strength magnets made from neodymium-based rare-earth magnets by a grain-boundary diffusion alloying method, for example. Note that the two permanent magnets 46 per pole, which are embedded in the magnet insertion hole 43, are fixed in the magnet insertion hole 43 through appropriate means, such as caulking.

The rotor 12 having the above-described structure was simulated from a variety of perspectives. As a result, when the embedment depth of the magnet 46, specifically, the embedment depth by which an inner end of each magnet 46 is embedded in the magnet insertion hole 43 from the outer periphery of the rotor, is represented by F, a circumferential distance of the auxiliary magnetic pole 42, specifically, an interpole distance between the main magnetic poles 41 at the position on the outer periphery of the rotor 12 is represented by L, and they are used as parameters, it was found that the efficiency of the electric motor 10 showed maximum values when the embedment depth F and the interpole distance L are set to certain values.

Figure 6:
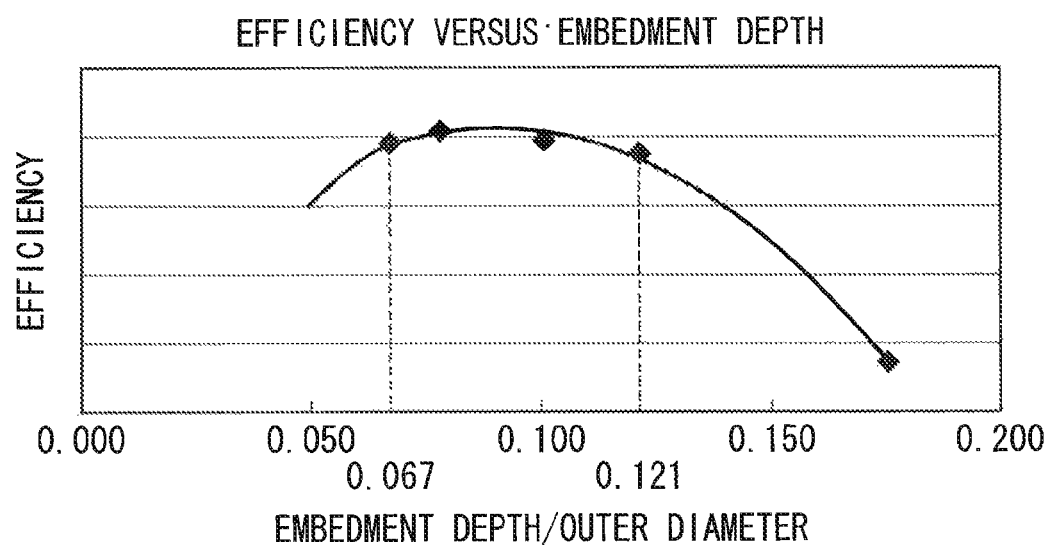
FIG. 6 is an explanatory diagram for explaining the relationship between magnet embedment depth and efficiency, in the rotor according to the present invention.
Figure 7:
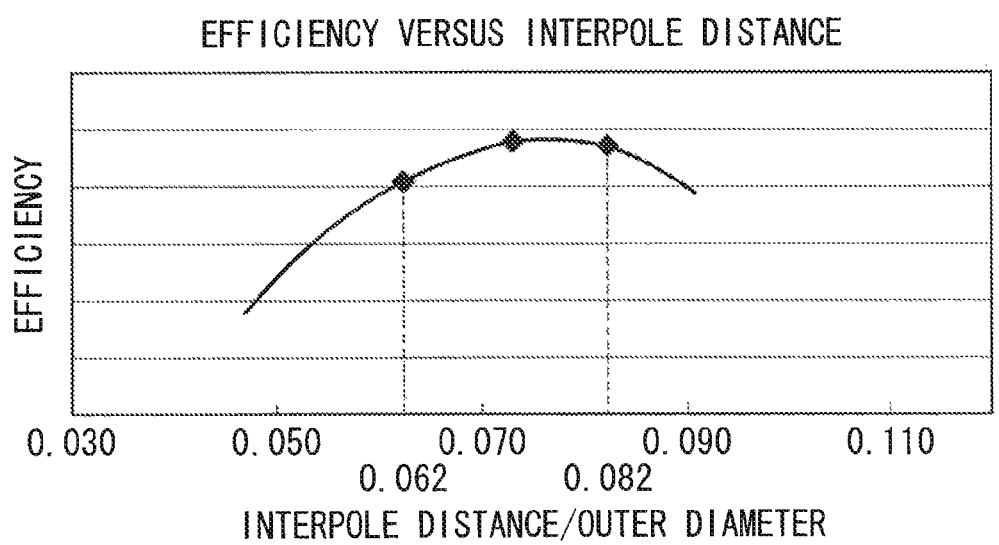
FIG. 7 is an explanatory diagram for explaining the relationship between distance between magnetic poles of magnets and efficiency, in the rotor according to the present invention.

Specifically, when the outer diameter of the rotor 12 is represented by D, as shown in FIG. 6, it was found that the motor efficiency showed the maximum value when F/D is set to 0.078, and the efficiency thereof could be maintained in a desired range by setting F/D within a range from 0.067 to 0.121. Similarly, as shown in FIG. 7, the motor efficiency shows the maximum value when L/D is set to 0.073, and the efficiency thereof can be maintained in a desired range by setting L/D within a range from 0.062 to 0.082.

According to this embodiment, the following advantageous effects are afforded by the above-described structure.

When power is applied to the electric motor 10 via the inverter (not shown) mounted in the inverter accommodating portion 7, and the electric motor 10 is rotationally driven, low-pressure refrigerant gas is suctioned into the space 13 via the suction port provided in the motor housing 4. This low-pressure gas passes through the gas passages between the stator 11 and the motor housing 4, cools the inverter in the inverter accommodating portion 7 via a wall surface of the motor housing 4, flows into a space located near the bearing member 16, and is then suctioned therefrom into the pair of compressor spaces 23 of the scroll compression mechanism 20, provided in the compressor housing 31.

While the volumes of the pair of compressor spaces 23 are being reduced through the orbital motion of the orbiting scroll 22, the low-pressure gas suctioned into the pair of compressor spaces 23 is moved toward a center side, thereby being compressed. Then, when the compressor spaces 23 are joined at the center, and the thus-formed compression space communicates with the discharge port 26, provided at the center portion of the fixed scroll 21, the compressed high-pressure gas pushes the discharge valve 27 open and is discharged into the discharge chamber 25. This high-pressure gas is sent out to a refrigeration cycle side via the discharge opening 28, circulates in the refrigeration cycle, and is again suctioned from the suction port into the electric compressor 1.

During this time, DC power supplied from an external power source to the inverter mounted in the inverter accommodating portion 7 is converted, at the inverter, into three-phase AC power having a frequency that a superordinate control device instructs the inverter to set, and the three-phase AC power is applied from a UVW terminal provided on the inverter side to the stator 11 of the electric motor 10 via the hermetic terminal 8, a cluster block 34 connected to the hermetic terminal 8, and a motor lead. Thus, the rotor 12 is rotationally driven at a required rotational speed, and the scroll compression mechanism 20 is driven via the rotary shaft 14.

The rotor 12 of the electric motor 10 includes the cylindrical rotor iron core 40, in which the plurality of main magnetic poles 41 and the plurality of auxiliary magnetic poles 42 are alternately disposed in the circumferential direction; the magnet insertion hole 43, which is provided for each of the main magnetic poles 41 and which has substantially a V-shape whose convex portion faces the rotor center O and is centered on the d-axis passing through the rotor center O and the circumference-wise center of the main magnetic pole 41; and the two magnets 46 per pole, which are embedded in the magnet insertion hole 43 in a substantially V-shaped manner. When three-phase AC power is applied to the stator 11 to produce a rotating magnetic field, the rotating magnetic field acts on the permanent magnets 46 of the rotor 12 to produce a magnetic torque, and, in addition to the magnetic torque, a reluctance torque acts on the rotor 12, and the rotor 12 is rotationally driven by a predetermined torque.

The magnetic shielding space 45, which shields an area between the poles of the adjacent magnets 46, is provided at the convex portion of the magnet insertion hole 43, and the magnetic shielding space 45 has a trapezoidal shape having a predetermined width in the circumferential direction and having protruding portions that protrude radially outward and inward with respect to the magnet insertion hole 43. When the magnetic shielding space 45 is formed in a shape having a predetermined width in the circumferential direction and having protruding portions that protrude radially outward and inward with respect to the magnet insertion hole 43, in this way, it is possible to reduce the size of each magnet 46 as much as possible corresponding to the size of the magnetic shielding space 45 and to reduce leakage magnetic flux caused by short-circuit between the two magnets 46 embedded in the magnet insertion hole 43, thus reducing reactive magnetic flux.

Thus, according to this embodiment, it is possible to reduce the use of a rare-earth material (for example, neodymium) that forms the magnet according to a reduction in the size of the permanent magnet 46, thus achieving a reduction in cost, and to increase the magnetic flux density to increase the magnetic torque, thus improving the efficiency of the motor 10 and achieving a reduction in the size and cost of the motor 10.

Furthermore, the magnetic shielding space 45 has a substantially trapezoidal shape whose upper and lower portions protrude radially outward and inward with respect to the magnet insertion hole 43. Thus, by appropriately setting the lengths of the upper and lower sides of the magnetic shielding space 45, having a substantially trapezoidal shape, the magnetic shielding space 45, which has a required size having a predetermined width in the circumferential direction and having protruding portions that protrude radially outward and inward with respect to the magnet insertion hole 43, can be formed at the convex portion of the substantially V-shaped magnet insertion hole 43. By sufficiently increasing the size of the magnetic shielding space 45, the size of the magnet 46 and the leakage magnetic flux can be reliably reduced.

Furthermore, in this embodiment, when the embedment depth by which the inner end of the magnet 46 is embedded in the magnet insertion hole 43 from the outer periphery of the rotor 12 is represented by F, the interpole distance between the main magnetic poles 41 at the position on the outer periphery of the rotor 12 is represented by L, and the outer diameter of the rotor 12 is represented by D, as shown in FIGS. 6 and 7, F/D is set within the range from 0.067 to 0.121, which includes 0.078 at which the motor efficiency shows the maximum value, and L/D is set within the range from 0.062 to 0.082, which includes 0.073 at which the motor efficiency shows the maximum value.

In this way, by setting F/D within the range from 0.067 to 0.121, which includes 0.078 at which the motor efficiency shows the maximum value, and setting L/D within the range from 0.062 to 0.082, which includes 0.073 at which the motor efficiency shows the maximum value, the efficiency of the electric motor 10 can be maintained in a desired range, as is apparent from FIGS. 6 and 7. The embedment depth F of the magnet 46 and the interpole distance L between the main magnetic poles 41 are respectively optimized to improve the efficiency of the electric motor 10, thereby achieving a reduction in the size and cost of the electric motor 10.

Second Embodiment

Next, a second embodiment of the present invention will be described with reference to FIG. 4.

This embodiment differs from the above-described first embodiment in that projections 47 for setting the positions where the magnets 46 are installed are provided in the magnetic shielding space 45. Since the other points are the same as those of the first embodiment, a description thereof will be omitted.

Figure 4:
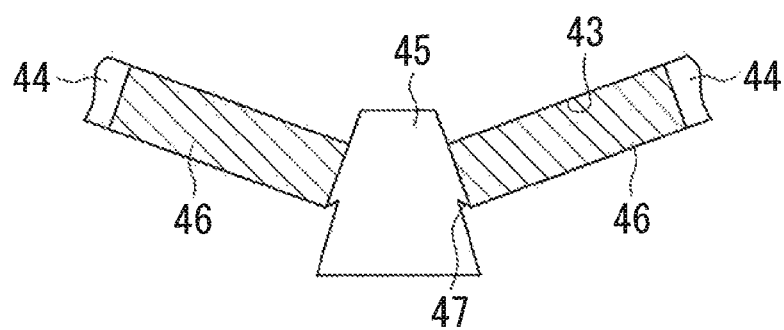
FIG. 4 is a view partially showing, in enlarged form, a magnet arrangement structure in a rotor according to a second embodiment of the present invention.

In this embodiment, in order to set the installation positions of the magnets 46 when the magnets 46 have been inserted into the magnet insertion hole 43, the projections 47, which project toward an inner side of the magnetic shielding space 45, are provided at portions where the magnetic shielding space 45 and the magnet insertion hole 43 intersect, as shown in FIG. 4.

In this way, by providing the projections 47, for setting the installation positions of the magnets, at the portions where the magnetic shielding space 45 and the magnet insertion hole 43 intersect, even when the radially protruding portions of the magnetic shielding space 45 are made to be sufficiently larger than the vertical extent of the magnet insertion hole 43, the magnets 46 inserted into the magnet insertion hole 43 can foe set and positioned at predetermined positions by means of the projections 47. Thus, it is possible to prevent the magnets 46 from moving into the magnetic shielding space 45 and to reliably position and install the magnets 46 at predetermined positions, thus bringing out a primary function.

Third Embodiment

Next, a third embodiment of the present invention will be described with reference to FIG. 5.

This embodiment differs from the above-described first embodiment in that the magnetic shielding space 45 is divided into a main magnetic-shielding space 45A and auxiliary magnetic-shielding spaces 45B and 45C. Since the other points are the same as those of the first embodiment, a description thereof will be omitted.

Figure 5:
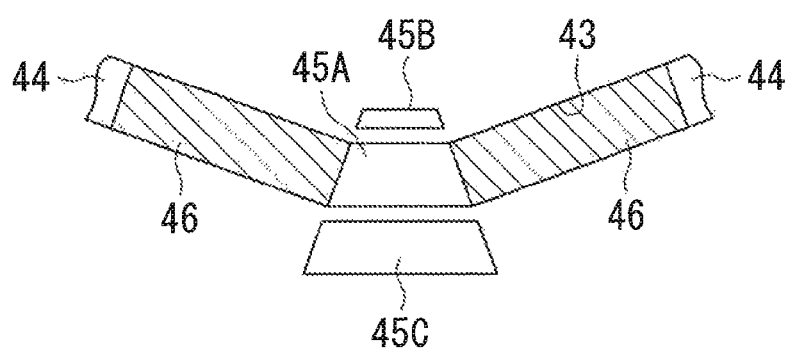
FIG. 5 is a view partially showing, in enlarged form, a magnet arrangement structure in a rotor according to a third embodiment of the present invention.

In this embodiment, the magnetic shielding space 45, which is provided at the convex portion of the substantially V-shaped magnet insertion hole 43 so as to protrude radially outward and inward, is divided into the main magnetic-shielding space 45A, which is provided between the substantially V-shaped magnet insertion hole 43, and the auxiliary magnetic-shielding spaces 4SB and 45C, which are separated by predetermined gaps from the main magnetic-shielding space 45A, as shown in FIG. 5.

As described above, the protruding portions of the magnetic shielding space 45, protrude radially outward and inward, are separated off above and below, thus obtaining the auxiliary magnetic-shielding spaces 45B and 45C, which are separated by predetermined gaps from the main magnetic-shielding space 45A, which is provided between the substantially V-shaped magnet insertion hole 43. Thus, it is possible reliably reduce leakage magnetic flux by means of both of the main magnetic-shielding space 45A and the auxiliary magnetic-shielding spaces 45B and 45C and to effectively use a reluctance torque as a rotating torque by making magnetic lines pass between the main magnetic-shielding space 45A and the separated auxiliary magnetic-shielding spaces 45B and 45C. Thus, both the magnetic torque and the reluctance torque can be used in a balanced manner, thus improving the motor efficiency.

Note that the present invention is not limited to the inventions according to the above-described embodiments, and appropriate modifications can be made without departing from the scope thereof. For example, in the above-described embodiments, although a description has been given of an example case in which the inverter accommodating portion 7 is provided on the outer periphery of the cylindrical housing 2, an inverter accommodating portion may be provided on an end face of the housing 2. Furthermore, the compression mechanism is not limited to a scroll-type compression mechanism, and any type of compression mechanism may be used.

Furthermore, in the above-described embodiments, although a description has been given of an example case in which the present invention is applied to a 6-pole motor, the number of poles in the motor is not limited thereto, and it is a matter of course that the number of poles in the motor may be greater than or less than 6. Furthermore, the angle of the substantially V-shape of the magnet insertion hole 43 and the angle of installation of the magnets 46 are not particularly limited, and they can be set at appropriate angles.

REFERENCE SIGNS LIST

1 electric compressor
10 electric motor
11 stator
12 rotor
14 rotary shaft
20 scroll compression mechanism (compression mechanism)
40 rotor iron core
41 main magnetic pole
42 auxiliary magnetic pole (auxiliary salient pole)
43 magnet insertion hole
45 magnetic shielding space (flux barrier)
45A main magnetic-shielding space
45B, 45C auxiliary magnetic-shielding space
46 permanent magnet (magnet)
47 projection
D rotor outer diameter
F embedment depth of magnet
L interpole distance between main magnetic poles
O rotor center

The invention claimed is:

1. An electric motor equipped with a rotor including a cylindrical rotor iron core in which a plurality of main magnetic poles and a plurality of auxiliary magnetic poles are alternately disposed in a circumferential direction, a substantially V-shaped magnet insertion hole that is provided for each of the main magnetic poles and whose convex portion faces a center of the rotor and is centered on a d-axis passing through the center of the rotor and a circumference-wise center of the main magnetic pole, and two magnets per pole that are embedded in the magnet insertion hole in a substantially V-shaped manner, wherein a magnetic shielding space that shields an area between poles of the adjacent magnets is provided at the convex portion of the magnet insertion hole;

the magnetic shielding space has a trapezoid shape having a predetermined width in the circumferential direction and whose upper and lower portions protruding radially outward and inward with respect to the magnet insertion hole;

projections for setting positions where the magnets are installed are provided at portions where the magnetic shielding space and the magnet insertion hole intersect;

the projections project toward an inner side of the magnetic shielding space; and when an embedment depth by which an inner end of each of the magnets is embedded in the magnet insertion hole from an outer periphery of the rotor is represented by F, and an outer diameter of the rotor is represented by D, F/D is set within a range from 0.067 to 0.121, the inner end of each of the magnets being in contact with the magnetic shielding space.

2. An electric motor according to claim 1, wherein the protruding portions of the magnetic shielding space, which protrude radially outward and inward, form separated auxiliary magnetic-shielding spaces located with predetermined gaps away from a main magnetic-shielding space located between the substantially V-shaped magnet insertion hole.

3. An electric motor according to claim 1, wherein, when an interpole distance between the main magnetic poles at a position on an outer periphery of the rotor is represented by L, and an outer diameter of the rotor is represented by D, L/D is set within a range from 0.062 to 0.082.

4. An electric compressor comprising a compression mechanism and an electric motor connected to the compression mechanism, the compression mechanism being drivable via the electric motor, wherein the electric motor is an electric motor according to claim 1.

* * * * *